United States Patent [19]
Gandhi et al.

[11] Patent Number: 4,782,038
[45] Date of Patent: Nov. 1, 1988

[54] PLATINUM GROUP ALUMINA-SUPPORTED, METAL OXIDATION CATALYSTS AND METHOD OF MAKING SAME

[75] Inventors: Haren S. Gandhi, Farmington Hills, Mich.; William L. H. Watkins, Toledo, Ohio

[73] Assignee: Ford Motor Company, Dearborn, Mich.

[21] Appl. No.: 112,642

[22] Filed: Oct. 26, 1987

[51] Int. Cl.$^4$ .......................... B01J 21/04; B01J 23/10; B01J 23/40
[52] U.S. Cl. .................................. 502/304; 423/213.5
[58] Field of Search ....................... 502/304; 423/213.5

[56] References Cited

U.S. PATENT DOCUMENTS

| | | | |
|---|---|---|---|
| 3,850,847 | 11/1974 | Graham et al. | 252/462 |
| 3,903,020 | 9/1975 | Sergeys et al. | 252/455 R |
| 3,993,572 | 11/1976 | Hindin et al. | 252/462 |
| 4,153,579 | 5/1979 | Summers et al. | 252/462 |
| 4,157,316 | 6/1979 | Thompson et al. | 252/462 |
| 4,189,404 | 2/1980 | Keith et al. | 252/462 |
| 4,283,308 | 8/1981 | Ohara et al. | 252/435 |
| 4,294,726 | 10/1981 | Bozon et al. | 252/462 |
| 4,331,565 | 5/1982 | Schaefer et al. | 252/462 |
| 4,367,162 | 4/1983 | Fujitani et al. | 252/443 |
| 4,407,735 | 10/1983 | Sawamura | 502/10 |
| 4,426,319 | 6/1984 | Blanchard et al. | 502/241 |
| 4,448,895 | 5/1984 | Ono et al. | 502/304 |
| 4,476,246 | 10/1984 | Kim et al. | 502/304 |
| 4,581,343 | 4/1986 | Blanchard et al. | 502/303 X |
| 4,591,580 | 5/1986 | Kim et al. | 502/303 |
| 4,714,694 | 12/1987 | Wan et al. | 502/304 |

Primary Examiner—W. J. Shine
Attorney, Agent, or Firm—Joseph W. Malleck; Roger L. May

[57] ABSTRACT

A catalyst construction and method of making is disclosed for treating automotive exhaust gases from a fossil fueled internal combustion engine. The construction comprises: (a) a substrate; (b) a coating on said substrate having comingled first and second phases, said first phase comprising ceria and precious metal in microscale intimacy and said second phase comprising precious metal substantially devoid of ceria and separated from the ceria in said first phase on a macroscale. The phases may be in particle form with (i) the first phase particles resulting from the codeposition of $CeO_2$, precious metal, and $Al_2O_3$ from an aqueous solution containing dissolved salts of $CeO_2$ and precious metal and suspended particles of $Al_2O_3$; and (ii) the second phase particles resulting from the codeposition of precious metal and $Al_2O_3$ from an aqueous solution containing a dissolved salt of the precious metal and suspended particles of $Al_2O_3$. Alternatively, the substrate has $Al_2O_3$ thereon to increase its surface area, and the two-phase coating is adhered to said $Al_2O_3$, said first phase resulting partially from the discontinuous deposition of $CeO_2$ onto said $Al_2O_3$ and partially from the continuous deposition of precious metal over said discontinuous $CeO_2$ and over the exposed $Al_2O_3$; the precious metal in immediate microscale contact with the $CeO_2$ constitutes the first phase and the precious metal not immediately in microscale contact with the $CeO_2$ constitutes the second phase.

20 Claims, 1 Drawing Sheet

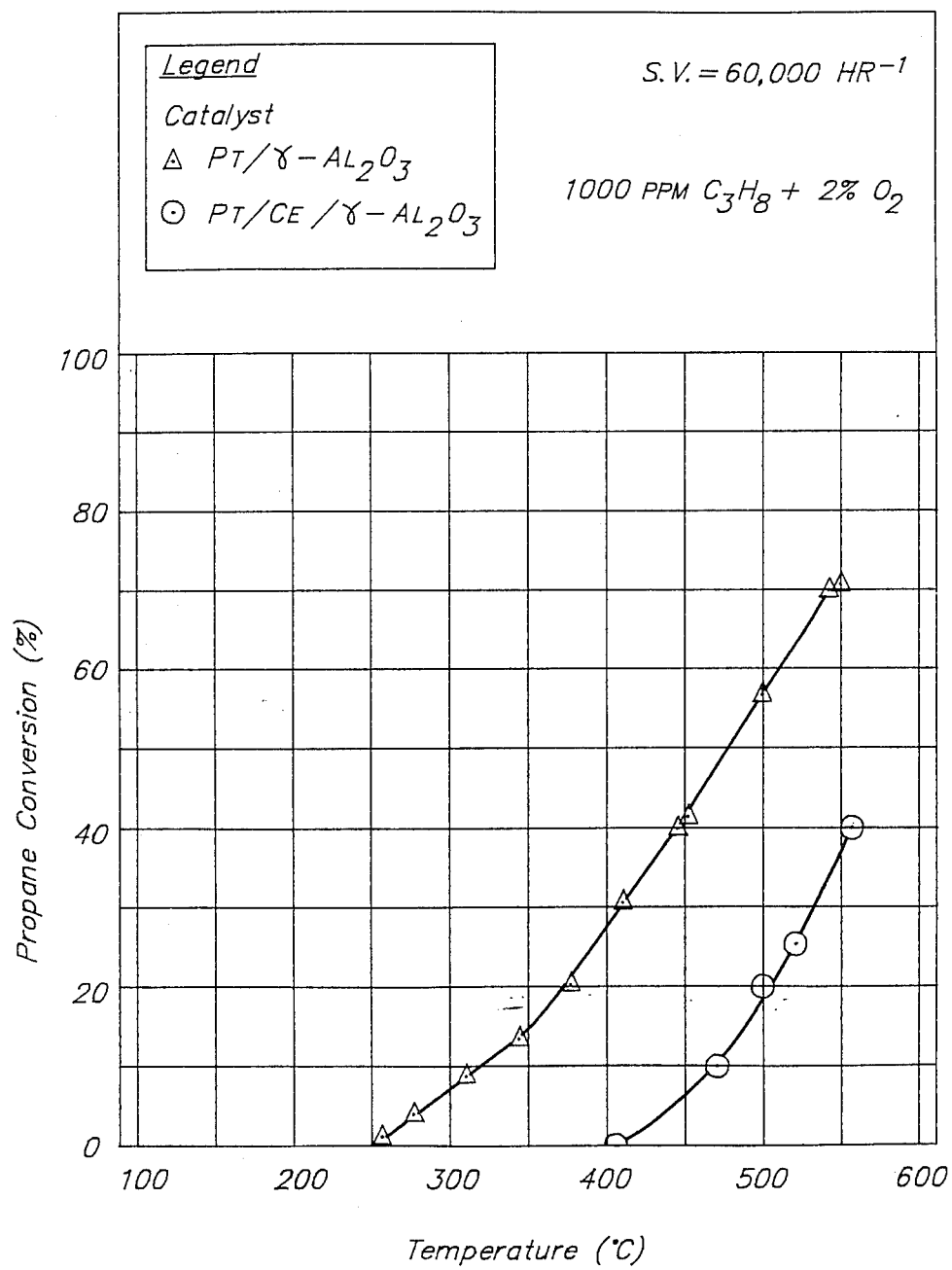

PLATINUM GROUP ALUMINA-SUPPORTED, METAL OXIDATION CATALYSTS AND METHOD OF MAKING SAME

BACKGROUND OF THE INVENTION

1. Technical Field

This invention relates to the art of making and using catalysts for automotive use and, more particularly, to the art of making alumina-supported, precious metal catalysts, which support has been stabilized by the use of ceria.

2. Description of the Prior Art

The use of transition-type aluminas as a suitable support for automotive exhaust gas catalysts encounter at least one very significant problem. That is, as the temperature increases during use of such alumina supports, they undergo a phase change to alpha alumina. This instability is undesirable because it results in a severe loss of surface area and physical strength. These changes, in turn, lessen the effectiveness of the catalysts because of shrinkage, which causes lower activity and loss of catalyst due to attrition.

Several ingredients have heretofore been commercially employed as alumina stabilizers, namely, barium oxide, lanthanum oxide, and cerium oxide. These oxides are usually promoted by impregnating the catalyst substrate with a solution in which is dissolved a salt of such metals for such oxides. Calcination of such impregnated substrate results in a washcoat of the desired metal oxide.

Of such stabilizers, ceria also has the ability to absorb and store oxygen on the catalyst when an exhaust gas temporarily becomes oxygen-excess and to release oxygen when it becomes oxygen-short. Thus, if an insufficiency of oxygen, required for oxidation of CO or HC, should occur for a moment in a reaction gas, when ceria and a precious metal are intimately deposited on alumina, the reaction of the gas can be carried out by oxygen release from the cerium. This oxygen transfer characteristic of ceria further enhances the catalytic effectiveness of precious metals, particularly at and adjacent stoichiometric conditions.

To utilize these dual advantages of ceria, there has developed two distinct manners of use of ceria for oxidation catalysts: (i) use of finely divided $CeO_2$ as a codeposit with a small quantity of precious metal resulting in a microscale intimacy between the elements in the resulting coating, represented by U.S. Pat. Nos. 3,850,847; 4,448,895; 3,993,572; and 4,367,162; and (ii) a first deposition of $CeO_2$ onto the substrate followed by a separate deposition of the usually small quantity of precious metal, but still resulting in a microscale intimacy between $CeO_2$ and the precious metal, such as represented in U.S. Pat. Nos. 4,448,895; 4,591,580; 4,407,735; 4,476,246; 4,426,319; 4,153,579; 3,903,020; 4,157,316; 4,331,565; 4,189,404; 4,283,308; and 4,294,726.

As part of the research leading to this invention, it has been discovered that the use of cerium oxide with precious metals in microscale intimacy results in two problems: (a) a lack of tolerance to lead poisoning, and (b) the suppression of catalytic activity of saturated hydrocarbons.

With respect to the increase in lead poisoning, this is not only a problem for engines supplied with lead-containing gasoline supplies, such as is prevalent in Europe and Australia, but also for engines adapted to run on leadfree gasoline since lead is typically present such latter gasolines in trace amounts. To convert lead oxide to lead sulphate in exhaust gases requires oxidation of $SO_2$ to $SO_3$; the presence of $SO_3$ converts lead oxide to harmless lead sulphate. But the presence of $SO_3$ is dependent upon the catalytic oxidation of $SO_2$ by the precious metal. Unfortunately, the microscale intimacy of ceria with the precious metal suppresses such catalytic activity. With respect to the suppression of catalytic activity for saturated hydrocarbons, this phenomena appears to be the result of the inability of ionic PdO to oxidize saturated hydrocarbons and the inhibition of the reduction of PdO to Pd by the presence of $CeO_2$.

Accordingly, a primary object of this invention is to provide a catalyst construction for automotive emissions, derived from fossil fuels, that will retain the advantages of ceria use and eliminate problems associated with ceria use.

SUMMARY OF THE INVENTION

To achieve the above object, a catalyst construction is disclosed herein for treating automotive exhaust gases from a fossil fueled internal combustion engine, which construction comprises: (a) a substrate; (b) a coating on said substrate having comingled first and second phases, said first phase comprising ceria and precious metal in microscale intimacy and said second phase comprising precious metal substantially devoid of ceria and separated from the ceria in said first phase on a macroscale.

Advantageously, the phases for the coating are in particle form with (i) the first phase particles resulting from the codeposition of $CeO_2$, precious metal, and $Al_2O_3$ from an aqueous solution containing dissolved salts of $CeO_2$ and precious metal and suspended particles of $Al_2O_3$; and (ii) the second phase particles resulting from the codeposition of precious metal and $Al_2O_3$ from an aqueous solution containing a dissolved salt of the precious metal and suspended particles of $Al_2O_3$. Alternatively, the substrate has $Al_2O_3$ thereon to increase its surface area, and the two-phase coating is adhered to said $Al_2O_3$, the first phase resulting partially from the discontinuous deposition of $CeO_2$ onto said $Al_2O_3$ and partially from the continuous deposition of precious metal over said discontinuous $CeO_2$ and over the exposed $Al_2O_3$; the precious metal in immediate microscale contact with the $CeO_2$ constitutes the first phase, and the precious metal not immediately in microscale contact with the $CeO_2$ constitutes the second phase.

Advantageously, the precious metal is selected from the platinum group, and particularly from the group consisting of platinum, palladium, rhodium, ruthenium, iridium, osmium, and mixtures thereof.

Another aspect of this invention is a method of making a catalyst system, having an alumina-containing coated substrate, for treating automotive exhaust gases. The method comprises impregnating or depositing onto the substrate a two-phase coating in which a first phase comprises $CeO_2$ and precious metal in microscale intimacy, and a second phase comprising precious metal substantially devoid of $CeO_2$ and separated from the $CeO_2$ in the first phase on a macroscale.

Again, advantageously, the phases for the coating of the method are in particle form with (i) the first phase particles resulting from the codeposition of $CeO_2$, precious metal, and $Al_2O_3$ from an aqueous solution containing dissolved salts of $CeO_2$ and metal and suspended particles of $Al_2O_3$; and (ii) the second phase particles resulting from the codeposition of precious metal and $Al_2O_3$ from an aqueous solution containing a dissolved salt of the precious metal and suspended particles of $Al_2O_3$.

In this second inventive aspect (i) the $CeO_2$ is preferably deposited in an amount of 2–20% by weight of the final coated substrate, (ii) the precious metal is deposited in an amount of 0.05–0.5% by weight of the final coated substrate, and (iii) the ratio of $Al_2O_3/CeO_2$ varies between 1:1 to 20:1. Preferably, the weight ratio of the first phase to the second phase is in the range of 4:1 to 1:4.

Advantageously, the codeposition of the first phase particles for the method is carried out by (i) dissolving in deionized water a salt of cerium and a salt of the precious metal and in which is suspended $Al_2O_3$, (ii) drying and calcining the solution to produce a collection of $Al_2O_3$ particles impregnated with $CeO_2$ and precious metal, (iii) forming an aqueous slurry of the impregnated collection of first phase particles, and (iv) dipping the substrate in the slurry.

Preferably, the wet-coated substrate is dried by heating to about 75° C. for about 3–5 hours. The second phase is prepared in a similar mode except that a salt of cerium is absent in solution for impregnating the $Al_2O_3$. A second slurry is made using the dried and calcined precious metal impregnated $Al_2O_3$ particles. The previously coated substrate is dipped in this second slurry, dried at about 75° C. about for 3–5 hours. The coated assembly may then be calcined by heating to about 800° C. for about four hours.

A third aspect of this invention is a method of using precious metal catalysts in the treatment of automotive exhaust gases, comprising: exposing such exhaust gases to a comingled two-phase catalyst construction, wherein a first phase comprises precious metal and ceria in microscale intimacy, and a second phase comprises precious metal substantially devoid of ceria and separated from the ceria in said first phase on a macroscale. The exhaust gases contain unsaturated hydrocarbons and lead oxide; the temperature of the exhaust gases, under treatment, is in the range of 250–1000° C. and at 15,000–100,000 $Hr^{-1}$ space velocity.

DESCRIPTION OF THE DRAWING

FIG. 1 is a graphical illustration of the effect of temperature on conversion efficiency of propane (a saturated hydrocarbon).

DETAILED DESCRIPTION AND BEST MODE

To disclose how a dual-phase catalyst construction can be provided having microscale intimacy between ceria and the precious metal in one phase and macroscale separation between the precious metal and ceria in the other phase, the following best mode for the construction and its method of making is presented.

Exhaust Gases to be Treated

Exhaust gases to be treated by the catalyst construction hereunder are emitted by internal combustion engines fueled by fossil fuel (gasoline or diesel fuel). In such exhaust gases, there will be found saturated hydrocarbons, such as propane, and a presence of lead varying in degree with the country or method of producing the fuel for the engine. The gases from such engines are delivered to the catalyst construction and pass therethrough at a space velocity advantageously in the range of 15,000–100,000 $Hr^{-1}$ and at a temperature in the range of about 250°–1000° C.

Substrate

A suitable catalyst substrate having a high surface area to volume ratio, preferably a monolithic cordierite cellular body having at least 300 cells per square inch and a fresh BET area of at least 15 $m^2/gm$ and a six mil wall thickness, is used. To achieve the high surface area to volume ratio of the substrate, it is conventional to apply a washcoat or slip of $Al_2O_3$ to such substrate. Such $Al_2O_3$ coating may also contain additional components selected from the group consisting of titania, zirconia, silica, magnesia, strontium oxide, and calcium oxide. Such coating will typically comprise between 3–25% by weight of the finished refractory supported catalyst. The $Al_2O_3$ washcoat promotes a high surface area, typically about 20–30 $m^2/gm$. To stabilize such $Al_2O_3$ and inhibit it from changing to alpha alumina at heated temperatures, stabilizing agents selected from the group consisting of $CeO_2$, $La_2O_3$, or BaO have been placed in intimate relationship with the $Al_2O_3$. $CeO_2$ is most desired because it not only acts as a stabilizer for $Al_2O_3$, but promotes exhaust gas reactions and acts as an oxygen storer for precious metal catalysts, and may even alleviate some sulphur poisoning. Unfortunately, it has been discovered that $CeO_2$ (i) promotes an intolerance to lead by acting as an inhibitor of the conversion of $SO_2$ to $SO_3$, the latter being so necessary to conversion of lead oxide to lead sulphate, and (ii) inhibits the oxidation of saturated hydrocarbons by slowing down the reduction of precious metal oxides to their elemental stage.

To maintain the above advantages of $CeO_2$ in conjunction with $Al_2O_3$, and eliminate the above disadvantages, a two-phase catalyst coating is used. The substrate or two-phase coating may also contain other surface extenders, stabilizers, or promoters as long as they do not functionally inhibit the desired effects of $CeO_2$ and the precious metals.

The refractory substrate may, however, be physically formed as discrete parts, such as pellets or extrudites, and may be selected from other materials such as mullite, birconia, titania, spinel, silica, silica/alumina, or alumina. The monolith construction is preferred because it is more durable by avoiding the shifting of discrete parts due to thermal changes of the container which may result in the destructive grinding of such parts, such as pellets. The substrate may also be a metal requiring similar coating techniques.

First Phase

An aqueous slip or slurry is prepared with alumina particles impregnated with cerium oxide and precious metal. The $Al_2O_3$ particles in each of the phases will act as the surface extender provided in prior art constructions by an $Al_2O_3$ washcoat. The monolith substrate is then preferably dipped in such slip or slurry to wet the monolith and coat it with the ceria and precious metal impregnated alumina particles. The coating should be applied so that it provides a coating in the range of 18–40 $gm/ft^3$, preferably about 20 $gm/ft^3$.

The alumina is preferably derived from agglomerated gamma alumina powder having a high surface area (180 $m^2/gm$ BET area. Such alumina typically has an average particle size of about 20 nm, a density of about 2.9 $gm/cm^3$, and a purity greater than 99.6% alumina.

The cerium oxide is impregnated into the alumina preferably by forming a slurry of the alumina powder in deionized water to which is added a water solution A of $Ce(NO_3)_3$—$6H_2O$. Advantageously, such solution A is prepared by adding about 69 grams of the cerium salt to about 320 grams of distilled water and mixing thoroughly. Such solution A is then added to an alumina slurry which has been prepared by suspending a mixture of about 168 grams of the powdered alumina in about 1000 grams of distilled water; solution A is blended into such slurry and mixed thoroughly. Other water soluble salts may, of course, be used in amounts to achieve the equivalent amount of cerium hydroxide precipitate as here illustrated. The uniform, adhered coating of cerium hydroxide on the alumina granules was obtained by the addition of ammonium hydroxide in amounts sufficient to achieve complete precipitation of the cerium. The precipitation occurs in accordance with the following reaction:

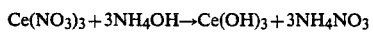

$$Ce(NO_3)_3 + 3NH_4OH \rightarrow Ce(OH)_3 + 3NH_4NO_3$$

The resulting aqueous suspension of coated alumina granules is then filtered and the residue thoroughly washed using distilled water and dried at about 75° C. i.e., 75–100° C. for about two hours to produce a dry cake. The resulting alumina granules in such cake, coated by the hydrated oxide of cerium $Ce_2O_3 \times H_2O$, constitutes a partially impregnated alumina particle needed for phase one.

The dry cake is crushed to pass a 48 mesh screen and ball milled in water to form a slurry. About 740 grams of the crushed and ball milled impregnated alumina granules is mixed with about 1100 grams of distilled water, to which may be added a small amount of a dispersant or a binder, to form a second slurry. A solution B is prepared using a salt of a precious metal selected from the group consisting of palladium, platinum, rhodium, ruthenium, iridium, osmium, and mixtures thereof. The precious metal may be added as a salt in the form of a nitrate, chloride, tetramine, or nitrate. Advantageously, the precious metal salt is selected from the group of chloroplatinic acid and platinic chloride. To about 75 grams of distilled water, about 13 grams of chloroplatinic acid (containing about 39.5% platinum) is added. This solution B is then added, preferably by drops, to the second slurry and mixed thoroughly. Such mixing was continued for at least 15 minutes and the viscosity was allowed to stabilize by letting the slurry stand for several hours. Such slurry thus becomes the medium for a first dipping of the monolith. Excess slurry is blown off and the wet coating is dried at about 75° C. in ambient air for about two hours.

Alternatively, the solutions A and B may be added to a single slurry containing suspended $Al_2O_3$, avoiding the two-step impregnation of the $Al_2O_3$ particles. Moreoever, deposition or impregnation may also be carried out by spraying or other equivalent means. Alternatively, $CeO_2$ may be discontinuously deposited onto the $Al_2O_3$ by use of high temperature sintering or by use of $Al_2O_3$, some with and some without $CeO_2$ to give discontinuity.

Second Phase

A slurry of suspended $Al_2O_3$ particles is prepared to which is added solution B. About 700 grams of $Al_2O_3$ and about 88 grams of solution B are utilized. The coated substrate is dipped in the second phase slurry and dried.

The finished catalyst should have a composition by weight of about 0.05–50% precious metal, 2–20% $CeO_2$, and 20–40% $Al_2O_3$, with the coating being 22–61% by weight of the finished catalyst. The ratio of $Al_2O_3/CeO_2$ should be in the range of 1:1 to 20:1.

The above catalyst construction provides a two-phase precious metal catalyst construction with a first phase comprised of alumina particles impregnated with ceria and precious metal in microscale intimacy (due to the codeposition of the ceria and precious metal together from a slurry or slip preparation), and a second phase comprised of precious metal impregnated into a separate collection of alumina particles (which, when deposited over the previously coated alumina particles, forms a phase where the precious metal is not only substantially devoid of ceria but is separated from ceria in the first phase on a macroscale). Microscale intimacy is herein defined to mean atomic proximity between Ce and the precious metal. Macroscale separation is defined herein to mean that in no instance in the matrix of the second phase can the nearest atomic neighbor of an atom of the precious metal be cerium.

The first phase is effective to provide oxidation of automotive exhaust gases; the precious metal in the first phase oxidizes aromatic and olefinic hydrocarbons, all of which are unsaturated, as well as carbon monoxide. As indicated earlier, such a microscale intimacy between the ceria and precious metal inhibits the oxidation reaction of $SO_2$ to $SO_3$ which is a necessary constituent to oxidize lead oxide to a harmless constituent of lead sulphate. Thus, the first phase is not effective in oxidizing lead oxide and so is intolerant to lead poisoning of the gaseous constituents. The ceria in the first phase operates very effectively to enhance the oxidation capabilities of the precious metal catalyst and acts as an oxygen storage mechanism so that during excess oxygen conditions the ceria oxidizes to higher valance, and, in a reducing condition, is able to give up such stored oxygen to continue oxidation during conditions which are slightly less than stoichiometric.

The second phase has precious metal separated on a macroscale from the ceria in the first coating and thus is capable of oxidizing saturated hydrocarbons (such as $C_3H_8$, propane), and is also effective in promoting the oxidation of $SO_2$ to $SO_3$ to facilitate completion of the oxidation of lead oxide.

Test Examoles

Several tests were undertaken to corroborate the intended effects of this invention. First, a model reaction analysis was undertaken wherein a first catalyst sample coating was prepared similar solely to the first phase of this invention, including precious metal (platinum), ceria, and gamma alumina. The deposited ingredients of such first phase were in an amount of 3.7 weight percent for cerium, 0.7% for platinum, and 15–20% for gamma alumina.

The other sample coating was comprised essentially of the second phase of this invention, namely, a precious metal (platinum) and gamma alumina. In this second saple, the platinum was applied in an amount of 0.7 weight percent.

Each of these coating samples was applied as a slip coating to a cordierite cellular ceramic monolith. The coated monolith samples were subjected to a simulated exhaust gas flow at a level of about $SV = 60,000\ Hr^{-1}$;

the exhaust gas contained 1000 ppm of propane $C_3H_8$ and 2% oxygen. As shown in FIG. 1, the sample equivalent to the first phase demonstrated a low efficiency for oxidizing propane, and particularly at lower temperatures; the sample equivalent to the second phase had a high capability of conversion over a broader range of temperatures. As shown in Table I, sample 2 (equivalent to the first phase) had a relatively poor capability of oxidizing $SO_2$ to $SO_3$ at various temperatures as indicated. This was not true of sample 1 (equivalent to the second phase) containing simply platinum devoid of $CeO_2$, which had a much higher efficiency for converting $SO_2$ at the same various temperatures. This demonstrates the need for macroscale separation of PM and $CeO_2$ for preventing lead poisoning.

TABLE I

| | $SO_2$ OXIDATION (%) OVER Pt AND Pt/Ce CATALYSTS | | | | |
|---|---|---|---|---|---|
| | | T °C. | | | |
| Sample | Loading | 400 | 450 | 500 | 550 |
| 1 | Pt (0.07 wt. %) | 80 | 88 | 92 | 82 |
| 2 | Pt (0.07 wt. %) + Ce (3.7 wt. %) | 52 | 54 | 56 | 57 |

In another series of samples, the high temperature oxidizing effects of a three-way catalyst performance was examined. The precious metal loadings for this series are as indicated in Table II.

TABLE II

HIGH TEMPERATURE OXIDIZING EFFECTS ON THREE WAY CATALYST PERFORMANCE
Pretreatment: 940° C. in air (4 hrs.) after pulsator aging for 13,000 simulated miles.

| | | % Conversion (R = 1.0) | | | |
|---|---|---|---|---|---|
| Sample | PM = Pt/Rh (5/1) TWC | % CO 450° C. | % $C_3H_6$ 450° | % $C_3H_8$ 450° | % $C_3H_8$ 550° C. |
| 3 | [PM/$CeO_2$]/$Al_2O_3$ + PM/$Al_2O_3$ (20 G PM/ft³) | 96 | 100 | 70 | 76 |
| 4 | [PM/$CeO_2$]/[$Al_2O_3$] (35 G PM/ft³) | 91 | 100 | 33 | 45 |
| 5 | [PM/$CeO_2$]/[$Al_2O_3$] + PM (30 G PM/ft³) | 90 | 100 | 31 | 42 |

Sample 3 contains a first phase coating of precious metal and cerium oxide in microscale intimacy, impregnated onto $Al_2O_3$, and precious metal impregnated onto $Al_2O_3$ in a second phase coating thereover. The precious metal (PM) included platinum and rhodium in a 5:1 ratio, which is characteristic for a three-way catalyst. Sample 4 contained only a first phase coating consisting of cerium oxide and precious metal (in microscale intimacy) impregnated onto $Al_2O_3$, and with a higher precious metal loading.

In a fifth sample, precious metal and ceria (in microscale intimacy) were impregnated onto $Al_2O_3$ to form a first phase, and precious metal was coated onto the first phase without $Al_2O_3$ to promote microscale intimacy in another manner with the first phase.

All of the precious metal catalyst loadings were pretreated in air by heating at 943° C. for four hours after having been subjected to a pulsator aging at 13,000 simulated miles. Pulsator aging is defined herein to mean durability testing of catalyst with isodane containing lead, phosphorus, and sulphur. This is a conventional test.

As shown in Table II, the carbon monoxide had its highest conversion efficiency for sample 3 and the ability to convert unsaturated hydrocarbons ($C_3H_6$, such as propylene) was excellent, and the saturated hydrocarbons ($C_3H_8$, such as propane) also were at their highest conversion efficiencies. This is in contrast to samples 4 and 5, where the CO conversion efficiency dropped and the saturated hydrocarbon conversion efficiency dropped dramatically. Without some portion of the precious metal being separated on a macroscale from $CeO_2$, poor oxidation of saturated HC occurs.

While various examples of the invention have been illustrated and described, it will be noted that changes and modifications may be made without departing from the invention, and it is intended to cover in the appended claims all such modifications and equivalents as fall within the true spirit and scope of the invention.

We claim:

1. A method of making a catalyst system, having an alumina-containing coated substrate, for treating automotive exhaust gases, comprising:
   impregnating or depositing onto said substrate a two-phase coating in which a first phase comprises $CeO_2$ and precious metal of the platinum group in microscale intimacy, and a second phase comprising precious metal of the platinum group substantially devoid of $CeO_2$ and separated from said $CeO_2$ in said first phase on a macroscale.

2. The method as in claim 1, in which said $CeO_2$ is impregnated or deposited in an amount of 2–20% by weight of said coated substrate and said precious metal is impregnated or deposited in an amount of 0.05–0.5% by weight of said coated substrate.

3. The method as in claim 2, in which the weight ratio of the first phase to said second phase is in the range of 4:1 to 1:4.

4. The method as in claim 1, in which said precious metal is selected from the platinum group.

5. The method as in claim 1, in which said phases are in particle form with (i) the first phase particles resulting from the codeposition of $CeO_2$, precious metal, and $Al_2O_3$ from an aqueous solution containing dissolved salts of $CeO_2$ and precious metal and suspended particles of $Al_2O_3$, and (ii) the second phase particles resulting from the codeposition of precious metal and $Al_2O_3$ from an aqueous solution containing a dissolved salt of said precious metal and suspended particles of $Al_2O_3$.

6. The method as in claim 5, in which $CeO_2$ is deposited in an amount of 2–20% by weight of said coated substrate, said precious metal is deposited in an amount of 0.05–0.5% by weight of the final coated substrate, and the ratio of $Al_2O_3$/$CeO_2$ varies between 1:1 to 20:1.

7. The method as in claim 5, in which the codeposition of said first phase particles is carried out by (i) dissolving a salt of cerium and a salt of said precious metal in deionized water in which is suspended $Al_2O_3$, (ii) drying said solution to produce a collection of $Al_2O_3$ particles impregnated with $CeO_2$ and precious metal, (iii) forming an aqueous slurry of said impregnated collection of first phase particles, and (iv) dipping said substrate in said slurry.

8. The method as in claim 5, in which deposition of said second phase particles is carried out by (i) dissolving a salt for said precious metal in deionized water in which is suspended $Al_2O_3$, (ii) drying said solution to produce a collection of $Al_2O_3$ particles impregnated with said precious metal, (iii) forming an aqueous slurry of said collection of second phase particles, (iv) dipping said coated substrate in said slurry, and (v) drying and calcining said doubly coated substrate.

9. The method as in claim 5, in which said precious metal of the platinum group is selected from the group consisting of Platinum, palladium, rhodium, ruthenium, iridium, osmium, and mixtures thereof.

10. The method as in claim 8, in which said drying is carried out by heating to about 75–100° C. for about 3–5 hours, and said calcining is carried out by heating to about 800° C. for about 3–5 hours.

11. The method as in claim 1, in which said substrate is coated with $Al_2O_3$ prior to impregnation or deposition of said two-phase coating, said first phase resulting partially from the discontinuous deposition of $CeO_2$ onto said coated $Al_2O_3$ and partially from the continuous deposition of precious metal over said discontinuous $CeO_2$ and over the exposed $Al_2O_3$, said precious metal in immediate microscale contact with said $CeO_2$ constituting said first phase and the precious metal not immediately in microscale contact with $CeO_2$ constituting said second phase.

12. The method as in claim 11, in which said $CeO_2$ is discontinuously deposited onto said $Al_2O_3$ by the use of high temperature sintering or by use of $Al_2O_3$ with and without $CeO_2$ to give discontinuity.

13. The method as in claim 11, in which said $CeO_2$ is present in an amount of 4–8% by weight of said coated substrate and said precious metal is present in an amount of 0.05–0.25% by weight of the coated substrate.

14. The method as in claim 13, in which $Al_2O_3$ is present on said substrate in an amount of 25–30% by weight of the coated substrate and the ratio of $Al_2O_3/CeO_2$ is in the range of 3:1 to 7:1.

15. A catalyst construction for treating automotive exhaust gases from a fossil-fueled internal combustion engine, comprising:
(a) a substrate;
(b) a coating on said substrate having comingled first and second phases, said first phase comprising $CeO_2$ and precious metal of the platinum group in microscale intimacy providing atomic scale intimacy between $CeO_2$ and the precious metal, and said second phase comprising precious metal of the platinum group substantially devoid of $CeO_2$ and separated from the $CeO_2$ in said first phase on a macroscale in which the nearest atomic neighbor of an atom of said precious metal in said second phase is not Ce.

16. The construction as in claim 15, in which said phases are in Particle form with (i) the first phase Particles resulting from the codeposition of $CeO_2$, precious metal, and $Al_2O_3$ from an aqueous solution containing dissolved salts of $CeO_2$ and precious metal and suspended particles of $Al_2O_3$, and (ii) the second phase particles resulting from the codeposition of precious metal and $Al_2O_3$ from an aqueous solution containing a dissolved salt of said precious metal and suspended particles of $Al_2O_3$.

17. The construction as in claim 15, in which said substrate carries $Al_2O_3$ to increase its surface area, and said two-phase coating is superimposed over said $Al_2O_3$, said first phase resulting partially from the discontinuous deposition of $CeO_2$ onto said $Al_2O_3$ and partially from the continuous deposition of Precious metal over said discontinuous $CeO_2$ and over the exposed $Al_2O_3$, said precious metal in immediate microscale contact with said $CeO_2$ constituting said first phase and the precious metal not immediately in microscale contact with said $CeO_2$ constituting said second phase.

18. The construction as in claim 15, in which said substrate has a high surface area of at least 15–20 $m^2$/gram.

19. The construction as in claim 15, in which said precious metal of the platinum group is selected from the group consisting of platinum, palladium, rhodium, ruthenium, iridium, osmium, and mixtures thereof.

20. The method as in claim 8, in which said precious metal salt is selected from the group of chloroplatinic acid and platinic chloride.

* * * * *

REEXAMINATION CERTIFICATE (4308th)
United States Patent
Gandhi et al.

(10) Number: US 4,782,038 C1
(45) Certificate Issued: Apr. 17, 2001

(54) PLATINUM GROUP ALUMINA-SUPPORTED, METAL OXIDATION CATALYSTS AND METHOD OF MAKING SAME

(75) Inventors: Haren S. Gandhi, Farmington Hills, MI (US); William L. H. Watkins, Toledo, OH (US)

(73) Assignee: The Ford Motor Company, Dearborn, MI (US)

Reexamination Request:
No. 90/005,467, Aug. 27, 1999

Reexamination Certificate for:
Patent No.: 4,782,038
Issued: Nov. 1, 1988
Appl. No.: 07/112,642
Filed: Oct. 26, 1987

(51) Int. Cl.[7] .............. B01J 21/04; B01J 23/10; B01J 23/40
(52) U.S. Cl. .............. 502/304; 423/213.5; 502/325; 502/326; 502/339
(58) Field of Search .............. 502/304, 325, 502/326, 339; 423/213.5

(56) References Cited

U.S. PATENT DOCUMENTS

| | | |
|---|---|---|
| 3,830,756 | 8/1974 | Sanchez et al. . |
| 4,157,316 | 6/1979 | Thompson et al. . |
| 4,189,404 | 2/1980 | Keith et al. . |
| 4,299,734 | 11/1981 | Fujitani et al. . |
| 4,500,650 | 2/1985 | Wyatt et al. . |
| 4,619,909 | 10/1986 | Ono et al. . |
| 4,714,694 | 12/1987 | Wan et al. . |
| 4,727,052 | 2/1988 | Wan et al. . |
| 4,806,519 | 2/1989 | Ghiba et al. . |

FOREIGN PATENT DOCUMENTS

| | | |
|---|---|---|
| 0 152 052 | 8/1985 | (EP) . |
| 0 171 151 | 2/1986 | (EP) . |
| 0 203 525 | 12/1986 | (EP) . |
| 0 251 708 | 1/1988 | (EP) . |
| H61-4532 | 1/1986 | (JP) . |

*Primary Examiner*—Tom Dunn

(57) ABSTRACT

A catalyst construction and method of making is disclosed for treating automotive exhaust gases from a fossil fueled internal combustion engine. The construction comprises: (a) a substrate; (b) a coating on said substrate having comingled first and second phases, said first phase comprising ceria and precious metal in microscale intimacy and said second phase comprising precious metal substantially devoid of ceria and separated from the ceria in said first phase on a macroscale. The phases may be in particle form with (i) the first phase particles resulting from the codeposition of $CeO_2$, precious metal, and $Al_2O_3$ from an aqueous solution containing dissolved salts of $CeO_2$ and precious metal and suspended particles of $Al_2O_3$; and (ii) the second phase particles resulting from the codeposition of precious metal and $Al_2O_3$ from an aqueous solution containing a dissolved salt of the precious metal and suspended particles of $Al_2O_3$. Alternatively, the substrate has $Al_2O_3$ thereon to increase its surface area, and the two-phase coating is adhered to said $Al_2O_3$, said first phase resulting partially from the discontinuous deposition of $CeO_2$ onto said $Al_2O_3$ and partially from the continuous deposition of precious metal over said discontinuous $CeO_2$ and over the exposed $Al_2O_3$; the precious metal in immediate microscale contact with the $CeO_2$ constitutes the first phase and the precious metal not immediately in microscale contact with the $CeO_2$ constitutes the second phase.

US 4,782,038 C1

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 4, 7–10, 15, 19 and 20 are cancelled.

Claims 2, 5, 11 and 16–18 are determined to be patentable as amended.

Claims 3, 6 and 12–14, dependent on an amended claim, are determined to be patentable.

New claims 21–38 are added and determined to be patentable.

2. The method as in *any of* claims 1 *and 29 through 34 and 35 through 37*, in which said $CeO_2$ is impregnated or deposited in an amount of 2–20% by weight of said coated substrate and said precious metal is impregnated or deposited in an amount of 0.05–0.5% by weight of said coated substrate.

5. The method as in *any of* claims 1 *and 29 through 34 and 35 through 37*, in which said phases are in particle form with (i) the first phase particles resulting from the codeposition of $CeO_2$, precious metal, and $Al_2O_3$ from an aqueous solution containing dissolved salts of $CeO_2$ and precious metal and suspended particles of $Al_2O_3$, and (ii) the second phase particles resulting from the codeposition of precious metal and $Al_2O_3$ from an aqueous solution containing a dissolved salt of said precious metal and suspended particles of $Al_2O_3$.

11. [The method as in claim 1] *A method of making a catalyst system, having an alumina-containing coated substrate, for treating automotive exhaust gases, comprising:*
   impregnating or depositing onto said substrate a two-phase coating in which a first phase comprises $CeO_2$ and precious metal of the platinum group in microscale intimacy, and a second phase comprises precious metal of the platinum group substantially devoid of $CeO_2$ and separated from said $CeO_2$ in said first phase on a macroscale,
   in which said substrate is coated with $Al_2O_3$ prior to impregnation or deposition of said two-phase coating, said first phase resulting partially from the discontinuous deposition of $CeO_2$ onto said coated $Al_2O_3$ and partially from the continuous deposition of precious metal over said discontinuous $CeO_2$ and over the exposed $Al_2O_3$, said precious metal in immediate microscale contact with said $CeO_2$ constituting said first phase and the precious metal not immediately in microscale contact with said $CeO_2$ constituting said second phase.

16. The *catalyst* construction as in *any of* claims [15] *21 through 27*, in which said phases are in [Particle] *particle* form with (i) the first phase [Particles] *particles* resulting from the codeposition of $CeO_2$, precious metal, and $Al_2O_3$ from an aqueous solution containing dissolved salts of $CeO_2$ and precious metal and suspended particles of $Al_2O_3$, and (ii) the second phase particles resulting from the codeposition of precious metal and $Al_2O_3$ from an aqueous solution containing a dissolved salt of said precious metal and suspended particles of $Al_2O_3$.

17. [The construction as in any of claims 1 and 15 and 31 through 38,] *A catalyst construction for treating automotive exhaust gases from a fossil-fueled internal combustion engine, comprising:*
   (a) *a substrate;*
   (b) *a coating on said substrate having commingled first and second phases, said first phase comprising $CeO_2$ and precious metal of the platinum group in microscale intimacy providing atomic scale intimacy between $CeO_2$ and the precious metal, and said second phase comprising precious metal of the platinum group substantially devoid of $CeO_2$ and separated from the $CeO_2$ in said first phase on a macroscale in which the nearest atomic neighbor of an atom of said precious metal in said second phase is not Ce;*
   in which said substrate carries $Al_2O_3$ to increase its surface area, and said two-phase coating is superimposed over said $Al_2O_3$, said first phase resulting partially from the discontinuous deposition of $CeO_2$ onto said $Al_2O_3$ and partially from the continuous deposition of Precious metal over said discontinuous $CeO_2$ and over the exposed $Al_2O_3$, said precious metal in immediate microscale contact with said $CeO_2$ constituting said first phase and the precious metal not immediately in microscale contact with said $CeO_2$ constituting said second phase.

18. The construction as in *any of* claims [15] *21 through 27*, in which said substrate has a high surface area of at least 15–20 $m^2$/gram.

*21. A catalyst construction for treating automotive exhaust gases from a fossil-fueled internal combustion engine, comprising:*
   *a. a substrate; and*
   *b. a coating on said substrate having commingled first and second phases, said first phase comprising $CeO_2$ and precious metal consisting essentially of palladium in microscale intimacy providing atomic scale intimacy between $CeO_2$ and the precious metal, and said second phase comprising precious metal consisting essentially of palladium substantially devoid of $CeO_2$ and separated from the $CeO_2$ in said first phase on a macroscale in which the nearest atomic neighbor of an atom of said precious metal in said second phase is not Ce;*
   *wherein the coating is a dip-coating from an aqueous slurry comprising particles of said first phase and of said second phase, and the precious metal in the catalyst instruction consists essentially of palladium.*

*22. A catalyst construction for treating automotive exhaust gases froma fossil-fueled internal combustion engine, comprising:*
   *a. a substrate; and*
   *b. a coating on said substrate having commingled first and second phases, said first phase comprising $CeO_2$ and precious metal comprising palladium in microscale intimacy providing atomic scale intimacy between $CeO_2$ and the precious metal, and said second phase comprising precious metal consisting essentially of palladium substantially devoid of $CeO_2$ and separated from the $CeO_2$ in said first phase on a macroscale in which the nearest atomic neighbor of an atom of said precious metal in said second phase is not Ce;*
   *wherein the coating is a dip-coating from an aqueous slurry comprising particles of said first phase and of said second* phase, and the catalyst construction consists essentially of said first phase particles and said second phase particles.

23. A catalyst construction for treating automotive exhaust gases from a fossil-fueled internal combustion engine, comprising:
   a. a substrate; and
   b. a coating on said substrate having commingled first and second phases, said first phase comprising $CeO_2$ and precious metal consisting essentially of platinum, palladium or a mixture thereof in microscale intimacy providing atomic scale intimacy between $CeO_2$ and the precious metal, and said second phase comprising a precious metal consisting essentially of palladium substantially devoid of $CeO_2$ and separated from the $CeO_2$ in said first phase on a macroscale in which the nearest atomic neighbor of an atom of said precious metal in said second phase is not Ce;
wherein the coating is a dip-coating from an aqueous slurry comprising particles of said first phase and of said second phase, and the precious metal in the catalyst construction consists essentially of palladium and optionally platinum.

24. A catalyst construction for treating automotive exhaust gases from a fossil-fueled internal combustion engine, comprising:
   a. a substrate; and
   b. a coating on said substrate having commingled first and second phases, said first phase comprising $CeO_2$ and precious metal of the platinum group in microscale intimacy providing atomic scale intimacy between $CeO_2$ and the precious metal, and said second phase comprising precious metal consisting essentially of palladium substantially devoid of $CeO_2$ and separated from the $CeO_2$ in said first phase on a macroscale in which the nearest atomic neighbor of an atom of said precious metal in said second phase is not Ce;
wherein the coating is a dip-coating from an aqueous slurry comprising particles of said first phase and of said second phase, and the catalyst construction consists essentially of said first phase particles and said second phase particles.

25. A catalyst construction for treating automotive exhaust gases from a fossil-fueled internal combustion engine, comprising:
   a. a substrate; and
   b. a coating on said substrate having commingled first and second phases, said first phase comprising $CeO_2$ and precious metal consisting essentially of palladium in microscale intimacy providing atomic scale intimacy between $CeO_2$ and the precious metal, and said second phase comprising precious metal consisting essentially of platinum, palladium or a mixture thereof, substantially devoid of $CeO_2$ and separated from the $CeO_2$ in said first phase on a macroscale in which the nearest atomic neighbor of an atom of said precious metal in said second phase is not Ce;
wherein the coating is a dip-coating from an aqueous slurry comprising particles of said first phase and of said second phase, and the precious metal in the catalyst construction consists essentially of palladium and optionally platinum.

26. A catalyst construction for treating automotive exhaust gases from a fossil-fueled internal combustion engine, comprising:
   a. a substrate; and
   b. a dip-coating on said substrate having commingled first and second phases, said first phase comprising $CeO_2$ and precious metal consisting essentially of palladium in microscale intimacy providing atomic scale intimacy between $CeO_2$ and the precious metal, and said second phase comprising precious metal consisting essentially of palladium substantially devoid of $CeO_2$ and separated from the $CeO_2$ in said first phase on a macroscale in which the nearest atomic neighbor of an atom of said precious metal in said second phase is not Ce;
wherein the precious metal in the catalyst construction consisting essentially of palladium.

27. A catalyst construction for treating automotive exhaust gases from a fossil-fueled internal combustion engine, comprising:
   a. a substrate; and
   b. a dip-coating on said substrate having commingled first and second phases, said first phase comprising $CeO_2$ and precious metal comprising at least palladium in microscale intimacy providing atomic scale intimacy between $CeO_2$ and the precious metal, and said second phase comprising precious metal consisting essentially of palladium and being substantially devoid of $CeO_2$ and separated from the $CeO_2$ in said first phase on a macroscale in which the nearest atomic neighbor of an atom of said precious metal in said second phase is not Ce,
wherein the catalyst construction consists essentially of said first phase particles and said second phase particles.

28. A catalyst construction in accordance with any of claims 21 through 27 wherein the dip-coating further comprises zirconia.

29. A method of making a catalyst construction, having an alumina-containing coated substrate, for treating automotive exhaust gases, comprising:
   forming an aqueous slurry of a mixture comprising first phase particles and second phase particles, the first phase particles comprising $CeO_2$ and precious metal consisting essentially of palladium, and the second phase particles being substantially devoid of $CeO_2$ and comprising precious metal consisting essentially of palladium; and
   dipping a substrate into the aqueous slurry to produce a coated substrate and then drying the coated substrate;
   the precious metal in the catalyst construction consisting essentially of palladium, and the $CeO_2$ and precious metal in the first phase particles being in microscale intimacy, and the precious metal in the second phase being separated from said $CeO_2$ in said first phase on a macroscale.

30. A method of making a catalyst construction, having an alumina-containing coated substrate, for treating automotive exhaust gases, comprising:
   forming an aqueous slurry of a mixture of first phase particles and second phase particles, the first phase particles comprising $CeO_2$ and precious metal comprising palladium, and the second phase particles being substantially devoid of $CeO_2$ and comprising precious metal consisting essentially of palladium; and
   dipping a substrate into the aqueous slurry to produce a coated substrate and then drying the coated substrate;
   the catalyst construction consisting essentially of said first phase particles and said second phase particles, and the $CeO_2$ and precious metal in the first phase particles being in microscale intimacy, and the precious metal in the second phase being separated from said $CeO_2$ in said first phase on a macroscale.

31. A method of making a catalyst construction having an alumina-containing coated substrate, for treating automotive exhaust gases, comprising:

forming an aqueous slurry of a mixture comprising first phase particles and second phase particles, the first phase particles comprising $CeO_2$ and precious metal consisting essentially of platinum, palladium or a mixture thereof, and the second phase particles being substantially devoid of $CeO_2$ and comprising precious metal consisting essentially of palladium; and dipping a substrate into the aqueous slurry to produce a coated substrate and the drying the coated substrate;

the precious metal in the catalyst construction consisting essentially of palladium and optionally platinum, and the $CeO_2$ and precious metal in the first phase particles being in microscale intimacy, and the precious metal in the second phase being separated from said $CeO_2$ in said first phase on a macroscale.

32. A method of making a catalyst construction, having an alumina-containing coated substrate, for treating automotive exhaust gases, comprising:

forming an aqueous slurry of a mixture of first phase particles and second phase particles, the first phase particles comprising $CeO_2$ and precious metal of the platinum group, and the second phase particles being substantially devoid of $CeO_2$ and comprising precious metal consisting essentially of palladium; and dipping a substrate into the aqueous slurry to produce a coated substrate and then drying the coating substrate;

the catalyst construction consisting essentially of said first phase particles and said second phase particles, and the $CeO_2$ and precious metal in the first phase particles being in microscale intimacy, and the precious metal in the second phase being separated from said $CeO_2$ in said first phase on a macroscale.

33. A method of making a catalyst construction, having an alumina-containing coated substrate, for treating automotive exhaust gases, comprising:

forming an aqueous slurry of a mixture comprising first phase particles and second phase particles, the first phase particles comprising $CeO_2$ and precious metal consisting essentially of palladium, and the second phase particles being substantially devoid of $CeO_2$ and comprising precious metal consisting essentially of platinum, palladium or a mixture thereof; and dipping a substrate into the aqueous slurry to produce a coated substrate and the drying the coated substrate;

the precious metal in the catalyst construction consisting essentially of palladium and optionally platinum, and the $CeO_2$ and precious metal in the first phase particles being in microscale intimacy, and the precious metal in the second phase being separated from said $CeO_2$ in said first phase on a macroscale.

34. A method of making a catalyst construction, having an alumina-containing coated substrate, for treating automotive exhaust gases, comprising:

forming an aqueous slurry of a mixture comprising first phase particles and second phase particles, the first phase particles comprising $CeO_2$ and the second phase particles being substantially devoid of $CeO_2$;

dipping a substrate into the aqueous slurry to produce a coating on the substrate; and then impregnating the coating with precious metal consisting essentially of palladium, the precious metal in the catalyst construction consisting essentially of palladium, and the $CeO_2$ and precious metal in the first phase particles being in microscale intimacy, and the precious metal in the second phase being separated from said $CeO_2$ in said first phase on a macroscale.

35. A method of making a catalyst construction having an alumina-containing coated substrate, for treating automotive exhaust gases, comprising depositing onto a substrate a coating comprising first phase particles comprising $CeO_2$ and second phase particles which are substantially devoid of $CeO_2$, the first phase particles and the second phase particles both being impregnated with catalytic metal consisting essentially of rhodium and at least one other precious metal of the platinum group, and the coating further comprising zirconia, the $CeO_2$ and precious metal in the first phase particles being in microscale intimacy, and the precious metal in the second phase being separated from said $CeO_2$ in said first phase on a macroscale.

36. A method of making a catalyst construction having an alumina-containing coated substrate, for treating automotive exhaust gases, comprising depositing onto a substrate a coating comprising first phase particles comprising $CeO_2$ and second phase particles which comprise alumina and are substantially devoid of $CeO_2$, the coating further comprising zirconia, and then impregnating both the first phase particles and the second phase particles with rhodium and another precious metal of the platinum group, the $CeO_2$ and precious metal in the first phase particles being in microscale intimacy, and the precious metal in the second phase being separated from said $CeO_2$ in said first phase on a macroscale.

37. A method of making a catalyst construction having an alumina-containing coated substrate, for treating automotive exhaust gases, comprising depositing onto a substrate a coating comprising first phase particles comprising $CeO_2$ and second phase particles which comprise alumina and are substantially devoid of $CeO_2$, the coating further comprising zirconia, and then impregnating both the first phase particles and the second phase particles with rhodium and platinum, the $CeO_2$ and precious metal in the first phase particles being in microscale intimacy, and the precious metal in the second phase being separated from said $CeO_2$ in said first phase on a macroscale.

38. A method of making a catalyst construction in accordance with any of claims 29 through 34 wherein the coating further comprises zirconia.

* * * * *